United States Patent [19]

Skala

[11] 4,232,342
[45] Nov. 4, 1980

[54] MULTIPLEXING FOR FACSIMILE SYSTEMS

[76] Inventor: Stephen F. Skala, 3839 S. Wenonah Ave., Berwyn, Ill. 60402

[21] Appl. No.: 925,389

[22] Filed: Jul. 17, 1978

Related U.S. Application Data

[63] Continuation-in-part of Ser. No. 740,805, Nov. 11, 1976, Pat. No. 4,117,518, and a continuation-in-part of Ser. No. 608,089, Aug. 27, 1975, abandoned, and a continuation-in-part of Ser. No. 350,943, Apr. 13, 1973, Pat. No. 3,943,525, and a continuation-in-part of Ser. No. 421,425, Dec. 3, 1973, abandoned.

[51] Int. Cl.³ .............................................. A04N 1/22
[52] U.S. Cl. .................................. 358/296; 358/258; 358/267
[58] Field of Search ............... 358/258, 263, 267, 256, 358/296, 285, 293, 294; 346/154, 155

[56] References Cited

U.S. PATENT DOCUMENTS

| | | | |
|---|---|---|---|
| 3,582,798 | 6/1971 | Veale | 358/267 |
| 3,592,963 | 7/1971 | Young | 358/293 |
| 3,622,703 | 11/1971 | Ricketts | 358/267 |
| 3,846,801 | 11/1974 | DuMont | 358/300 |
| 3,943,525 | 3/1976 | Skala | 346/140 R |
| 3,947,627 | 3/1976 | Tanaka | 358/294 |
| 3,972,053 | 7/1976 | Skala | 346/75 |
| 4,117,518 | 9/1978 | Skala | 358/296 |

Primary Examiner—Robert S. Tupper
Assistant Examiner—Alan Faber

[57] ABSTRACT

Facsimile systems, having a plurality of uniformly spaced scanning and printing elements in a linear array along their direction of advance, are coupled by time division multiplexed signals comprising a first component representing a sequence of light levels along an image line which are sampled cyclically, a second component representing completion of one sampling cycle and beginning of another as the scanning elements advance, and a third component representing a fixed reference position which each of the scanning elements pass.

Apparatus for generating the signal includes a cyclical circuit which is illustrated by a rotary switch operated by a stepping motor having one contact for each photodetector to generate the first component and one contact to generate the second component which may also be used for the third component. The three signal components are distinguished by pulse width which is determined by dwell time on the contacts.

A facsimile receiver includes a serial to parallel register to accumulate first signal components and to release them to control printing elements when a second component is received. The second component also provides a synchronous driving frequency for the printing elements. The third component is used to generate an error signal for correcting printing element position.

13 Claims, 4 Drawing Figures

MULTIPLEXING FOR FACSIMILE SYSTEMS

BACKGROUND

This application is a continuation-in-part of Ser. No. 350,943 filed Apr. 13, 1973 now U.S. Pat. No. 3,943,525; and of Ser. No. 421,425 filed Dec. 3, 1973 now abandoned; and of Ser. No. 608,089 filed Aug. 27, 1975 now abandoned; and is now a continuation-in-part of Ser. No. 740,805 filed Nov. 11, 1976 now U.S. Pat. No. 4,117,518.

This invention relates to facsimile systems and more particularly it relates to signals for such systems. The signals are characterized as time division multiplexed for control of a plurality of uniformly spaced printing elements.

Facsimile systems generally comprise transmitters which transform a graphic image into a signal, a communications channel which conducts the signal to remote receivers, and the remote receivers which include signal responsive printers to transform the signal back into a graphic image. One system used to print broadcast items on domestic receivers shares a portion of a television signal to control an ink drop printer which advances along a rotating cylinder to deposit selectively drops of liquid ink on an attached sheet of ordinary paper. An alternative configuration having the advantage of convenient paper handling includes a printing element traversing horizontally while paper advances vertically in a flat bed configuration. Signals for controlling such printers comprise one component as graphic information representing a sequence of elemental areas along an image line and another component as synchronizing information representing traverse speed or position. For an ink drop printer in a flat bed configuration, the graphic information is binary corresponding to presence or absence of an ink drop and the synchronizing information is a signal component corresponding to start of traverse. Such signals are analogous with television signals which include a video component and a horizontal sweep pulse.

Although some signal responsive printers having a light or charge sensitive recording surface respond to graphic information rapidly, those characterized by selective deposition of ink on a passive surface are limited by frequency response of material objects. Even ink jet printers based on selective charging tend to become impractically complex at drop repetition rates exceeding 100,000 per second. A way to increase speed of such printing systems is to increase the number of operating printing elements. One such system having a flat bed configuration and a plurality of uniformly spaced printing elements described herein uses an endless band having uniformly spaced ink jet orifices to provide constant horizontal sweep while signal responsive charging electrodes result in vertical deflection of ink drops. An equivalent pattern of ink drop deposition could be provided by an idealized system of uniformly spaced and rigidly coupled printing heads having a constant speed while printing in one direction along contiguous segments of a line and having an infinitely rapid return sweep. An equivalent pattern of ink drop deposition could also be provided by a linear array of stationary printing elements at each elemental area of a line with the printing elements controlled in groups to sequence ink ejection from uniformly spaced portions of the array as disclosed in my U.S. Pat. No. 3,943,525.

Such printing systems having a plurality of signal responsive printing elements could be controlled by a signal having a separate channel for each printing element as would be practical for direct coupling between transmitter and receiver in a copier. But when the transmitter is remote from the receiver and the signal modulates carriers for transmission, use of a plurality of frequencies for separate channels would result in complex and costly modulating and detecting apparatus. Accordingly, a principal object of this invention is to provide a system and method for multiplexing graphic information from a plurality of scanning elements for transmission to control a corresponding plurality of printing elements.

SUMMARY OF THE INVENTION

This and other objects and advantages are attained in accordance with this invention wherein graphic information initially generated in a parallel form is transformed to a sequential form along with synchronizing information for transmission and is transformed back to parallel form for control of printing. A plurality of uniformly spaced scanning elements in a linear array advances along a line parallel to the scanning elements to transform light reflected from a document into corresponding signal amplitudes. The signal amplitudes are sampled sequentially and represent graphic information as a first signal component. When all of the signal amplitudes have been sampled, a second signal component is generated to provide synchronizing information which indicates completion of one sampling cycle and beginning of another. The first and second signal components are generated in a cycle which is repeated as the scanning elements advance. When the scanning elements advance across a reference position, a third signal component is generated to provide reference position information. These three signal components are generated and combined sequentially as a time division multiplexed signal which controls modulation of a carrier for transmission on a single channel to a remote receiver. The receiver detects the transmitted signal and separates the three signal components. The first signal components are transferred under control of the second signal component to printing elements which correspond to the scanning elements. The third signal component, as reference position information, is compared to printing element position to determine need for correction.

Representative apparatus in which the processes just described are embodied is a facsimile transmitter and receiver having an endless band with uniformly spaced apertures and orifices moving at a constant speed across like dimensioned stationary photodetectors and ink drop charging electrodes to scan and to print an image line. Each of the photodetectors converts received light to a voltage level which is transformed to one of two output levels which correspond to black or white. A ring counter, represented by a stepping motor operated rotary switch, samples each of the output levels to generate sequentially the first signal components. A synchronizing signal position in the rotary switch generates the second signal component for each rotation of the rotary switch which is a sampling cycle. The synchronizing signal position in the rotary switch also generates the third signal component at times when the apertures have advanced across a reference position. The three signal components preferably are distinguished according to pulse width which is determined by dwell time on a contact of the rotary switch. The output of the rotary switch is a time division multiplexed signal which modulates a carrier for transmission. The signal is detected by a receiver and the three signal components are separated according to pulse width. A shift register accumulates the first signal components and releases them to control the printing elements in parallel when a second signal component is received. The second signal component may also control speed of the endless band by providing a synchronous driving frequency. The third signal component leads, lags, or coincides with an endless band reference position pulse and synchronous drive frequency is decreased, increased, or maintained respectively to maintain such coincidence.

DESCRIPTION OF THE VIEWS OF THE DRAWINGS

Referring to the drawings, FIG. 1 shows basic features of a combined facsimile receiver and transmitter based on a shared endless band. The endless band is constrained to a racetrack configuration which has one linear portion for sweeping modulated columns of ink drops and another linear portion for dissecting an image. A plurality of uniformly spaced openings in the endless band has the same distance between their centers as that of photodetectors and charging electrodes. Further, the openings are positioned similarly in the scanning and printing portions so that synchronism is intrinsic during operation as a copier.

Figures 1, 1A, 1B:
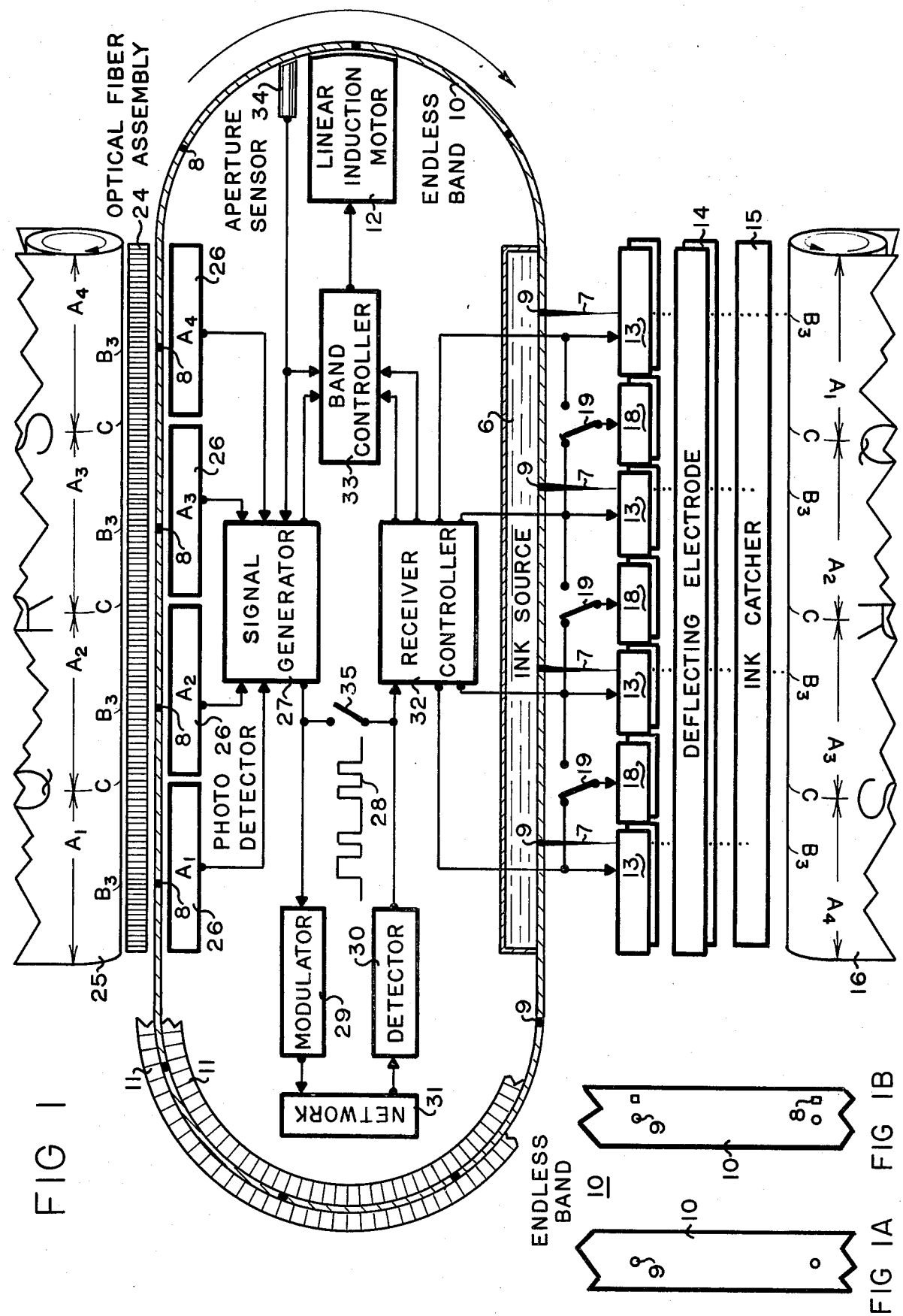
FIG. 1 is a highly diagrammatic representative of a combined facsimile transmitter, receiver, and copier using a common flexible endless band to provide a traversing and scanning function, and showing assemblies for transmitting and receiving graphic signals and for synchronizing the endless band.

The printer and endless band portions of the present facsimile system are described in more detail in my U.S. Pat. Nos. 3,971,040 and 3,972,053. Briefly, ink from an ink source 6 emerges under pressure as ink jets 7 from uniformly spaced orifices 9 in a flexible endless band 10. The endless band is constrained by fluid bearings 11, only partly shown, and advanced by the stator portion of a linear induction motor 12 which includes the endless band as a conductive armature in which currents are induced. When the orifices are positioned on the ink source as shown, the ink jets form drops between charging electrodes 13 which, in response to signals, are either at a high or at a zero voltage level. When the charging electrodes are at a high voltage level, the forming ink drops become electrically charged, are deflected in the electrostatic field of deflecting electrode 14 to deposit on ink catcher 15 from which ink is recycled to the ink source. When the charging electrodes are at zero voltage, the ink drops are not charged and project undeflected to deposit on a paper receiving surface 16. As the endless band advances, the ink jets approach transfer charging electrodes 18 which connect to adjacent charging electrodes 13 by means of transfer switches 19 which are preferably electronic devices. The transfer switches are synchronized with the position of the orifices so that when an ink jet is proximate to the gap between electrodes, both of the adjacent electrodes are at the same voltage and the charge induced on the ink drops is not a function of orifice position. The basic function of an endless band in the printer portion of the combined facsimile receiver and transmitter is to provide a linear motion at a constant speed for sweeping modulated columns of ink drops. Alternative methods for modulating columns of ink drops are described in my cited U.S. Pat. Nos. 3,971,040 and 3,972,053.

The transmitter portion of the present combined facsimile receiver and transmitter uses openings in the endless band to dissect an image of a document as the endless band advances between the document and a line of photodetectors. In the preferred embodiment of FIG. 1, an optical fiber assembly 24 transmits light reflected from an illuminated document 25 through apertures 8 in the endless band through which light passes to photodetectors 26. Alternative openings in the endless band are shown in FIGS. 1A and 1B. In FIG. 1A, openings 9 function both as orifices for ink jets and as apertures for light transmission. In FIG. 1B, openings 9 function only as orifices and openings 8 function only as apertures. The photodetectors are elongated structures which convert received light energy to a corresponding amplitude such as a voltage level. A suitable silicon photovoltaic photodetector is described by J. E. Young in U.S. Pat. No. 3,592,963. Voltage levels at the photodetectors enter signal generator 27 where they are converted to a time division multiplexed signal illustrated by 28. The time division multiplexed signal modulates a carrier in modulator 29 to represent the signal for transmission through network 31 to a detector 30 of a remote facsimile receiver. A receiver controller 32 separates the signal into components which represent synchronizing information and graphic information, converts the graphic information into one of the two voltage levels of the charging electrodes, and transmits synchronizing information to band controller 33 which drives the linear induction motor so that endless band speed and orifice position are synchronous with those of the remote transmitter. The signal generator 27, receiver controller 32, band controller 33, linear induction motor 12, and aperture sensor 34 are described in more detail with reference to FIG. 3. An alternative means for coupling the signal from signal generator 27 to receiver controller 32 is through a by-pass connection which includes switch 35 and is used during operation as a copier.

Network 31 represents various transmission systems to which the present invention can be adapted. A time division multiplexed signal occupies one channel in such networks and various graphic services may have unique characteristics to require individual channels. Publishing of newspapers and other periodicals can be controlled by information transmitted over one downstream channel from broadcaster to subscriber. Facsimile mail service includes addressing information and uses an up-stream and a down-stream channel between a central office and subscribers. Various types of broadband systems can be used according to population characteristics. As examples, subscribers in sparsely populated regions may use satellite facilities or land based radiated transmissions. Urban subscribers may use coaxial or optical fiber cables. Interfacing with such networks is provided by modulator 31 which transforms a signal 28 comprising voltages at two levels into a signal having corresponding binary characteristics to match the network and is also provided by detector 30 which transforms the binary characteristics back to a two level voltage. In a coaxial cable network, for example, the modulator includes an RF oscillator which is gated in response to signal 28 to generate a sequence of RF pulses which are coupled to a coaxial cable. A detector in a remote receiver is tuned to the RF carrier frequency and converts the received RF signal back to signal 28.

Letter designations $A_i$, $B_j$, and C relate signal components to structures of the facsimile transmitter and receiver. On document 25, lengths $A_1$, $A_2$, $A_3$, and $A_4$ are spanned by corresponding photodetectors. Since the distance between centers of adjacent apertures 8 and adjacent photodetectors is the same, the instant location of apertures over the photodetectors is the same distance from a reference location between the photodetectors. The reference location signal is generated by an aperture passing over aperture sensor 34. A first signal component $A_i$ represents light level detected by photodetector $A_i$, a second signal component $B_j$ represents instant location of the apertures over the photodetectors, and a third signal component C represents a reference location. These signal components control printing on paper receiving surface 16. The first signal components are directed to control charging electrodes 13 in response to a second signal component. The $A_i$ lengths on paper 16 indicate distances over which ink drop charging voltages on corresponding charging electrodes are effective. The C signal component provides synchronizing information to reset the endless band to the reference location over the aperture sensor.

Figure 2:
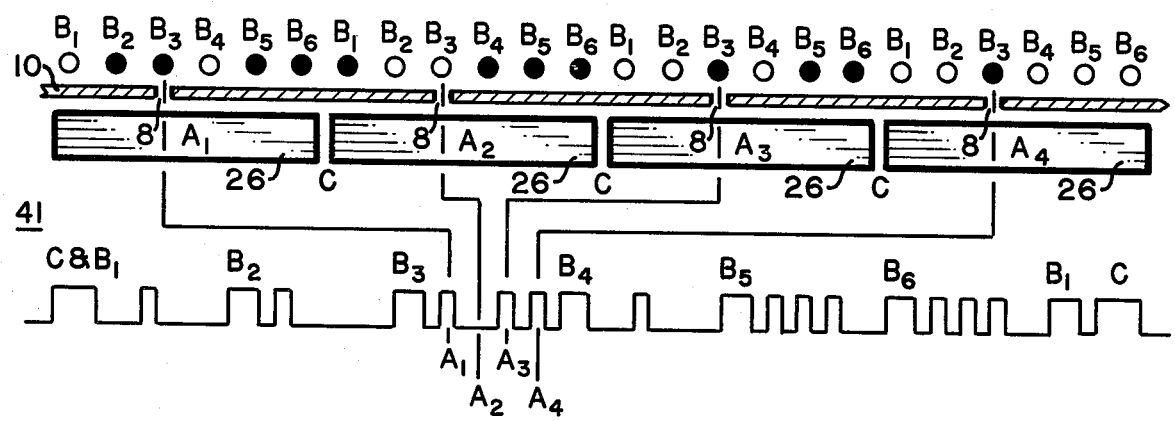
FIG. 2 is a highly diagrammatic representation of a scanned line of elemental areas which are detected at uniform intervals and are shown converted into a corresponding time division multiplexed signal.

FIG. 2 shows in more detail relations between a time division multiplexed signal 41 for controlling a plurality of uniformly spaced traversing printing elements, a corresponding plurality of scanning elements comprising photodetectors 26 and apertures 8, and an image line of elemental areas represented by a row of dots 40. Signal 41 is generated by advancing the apertures along the dots from $B_1$ to $B_6$. When the apertures are at location $B_3$ as shown, a pulse labeled $B_3$ is formed followed by pulse $A_1$ for the black dot at photodetector $A_1$, an absence of a pulse for the white dot at $A_2$, a pulse for the black dot at $A_3$, and a pulse for the black dot at $A_4$.

More generally, light reflected from an elemental area is detected by a scanning element and transformed to a corresponding amplitude. In the preferred embodiment, the amplitude is one of two voltage levels for control of a printer having binary characteristics. The amplitudes corresponding to each of the plurality of scanning elements are sampled in a predetermined order to generate a sequence of first signal components. In broadcast applications, the preferred predetermined order is that of the scanning elements. In facsimile mail, transmitters and receivers may be programmed to permute corresponding scanning and printing elements for privacy. The first signal component is preferably a pulse distinguished from other signal components by a characteristic pulse width. After each scanning element's corresponding amplitude has been sampled to generate a complete sequence of first signal components, a second signal component is generated to indicate beginning of sampling of amplitudes corresponding to adjacent elemental areas. After a complete set of second signal components has been generated, a third signal component is generated to provide scanning element reference location information which may be separate or combined with a $B_1$ pulse as shown in signal 41.

More representative magnitudes for the signal and structures for scanning and printing are $A_i$ ranging from $A_1$ to $A_{46}$ and $B_j$ ranging from $B_1$ to $B_{35}$ for aperture and orifice intervals of 0.25 inch, a resolution of 140 elemental areas per linear inch, and an $11\frac{1}{2}$ inch wide page. An $11\frac{1}{2}$ inch wide roll of paper allows a standard 8 inch long letter and a 16 inch long tabloid page to be printed by the same printing unit.

Figure 3:
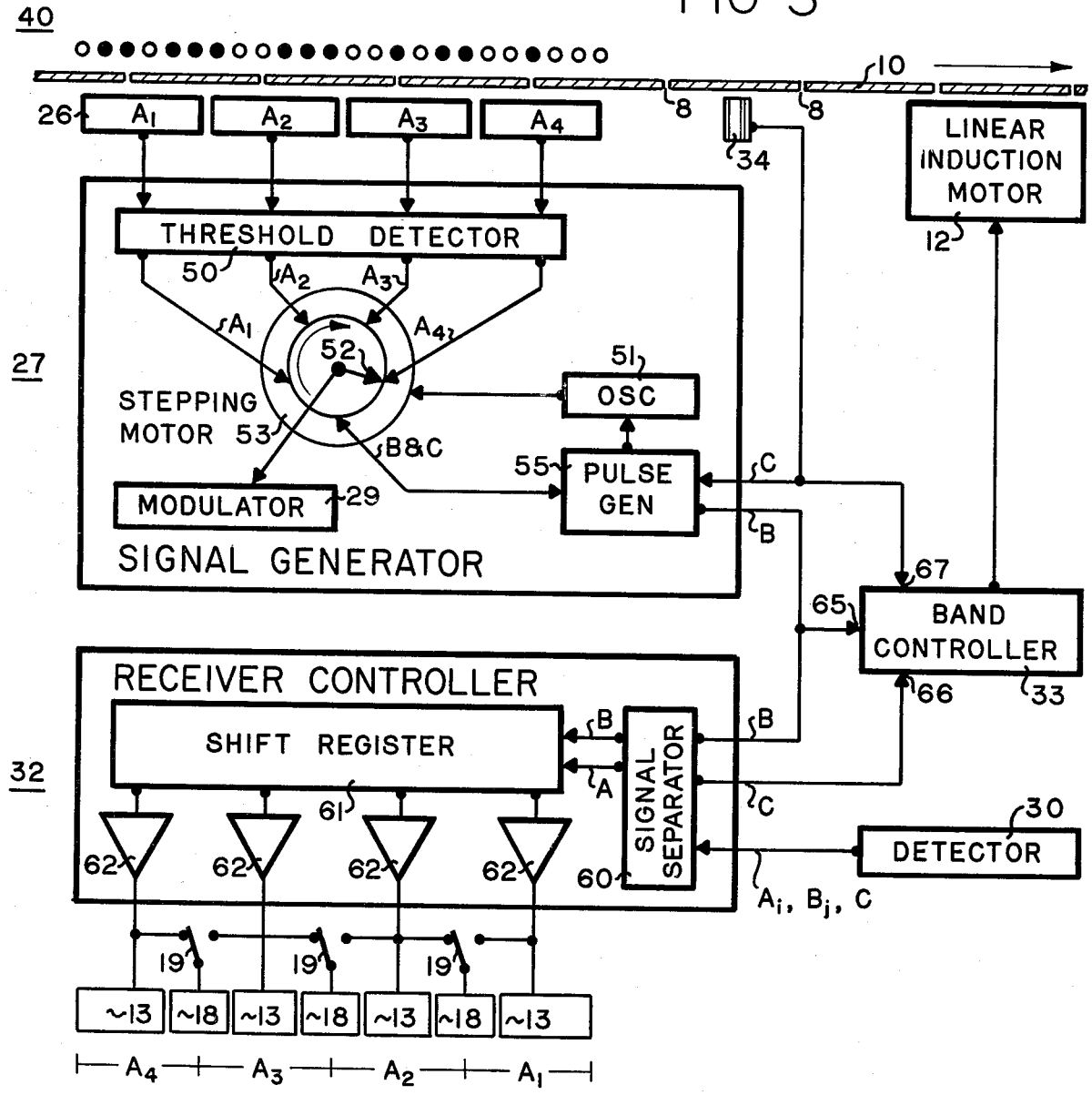
FIG. 3 is a highly diagrammatic representation of the transmitter and receiver signal processing apparatus showing a means for generating the signal and for using the signal to control a printer.

FIG. 3 shows in more detail portions of the facsimile transmitter and receiver described with reference to FIG. 1 which generate and are controlled by the signal described with reference to FIG. 2. A line along a document being scanned by apertures 8 in endless band 10 is represented by a row of dots 40. Light projected on photodetectors 26 is converted to a corresponding voltage which is connected to threshold detector 50. The threshold detector converts photodetector analogue voltage levels above or below a threshold reference voltage level into corresponding two-level voltage outputs with black corresponding to logic ONE and white to logic ZERO. The threshold detector comprises known comparator or trigger circuits. The two-level voltages at each output of the threshold detector are sampled by a commutator which generates a sequence of pulses from the logic ONE voltage levels and adds a synchronizing pulse when a sequence of sampled pulses is complete. The threshold detector outputs connect to contacts leveled $A_i$ of rotary switch 52. An oscillator and stepping motor controller 51 advances stepping motor 53 so that the rotary switch dwells on a contact for one interval and then advances to dwell between contacts for another interval to generate a sequence of pulses having a uniform pulse width. When the rotary switch is positioned on the contact labeled B&C, pulse generator 55 senses the switch position and inhibits the controller portion of 51 so that the dwell interval on the contact is extended for one pulse period to generate a second signal component. If at the same time aperture sensor 34 senses a passing aperture 8, the dwell interval is extended for an additional pulse period to generate a third signal component. The output of the rotary switch to modulator 29 is the sequential signal shown in FIG. 2 with the $A_i$, $B_j$, and C signal component pulse widths in the ratio 1:2:3 respectively. Circuit means for sensing position by an impedance change, for generating an inhibiting pulse on such impedance change by such means as a one-shot multivibrator, and for inhibiting a stepping motor advancing pulse by a negative inhibiting pulse on an otherwise positive input of an AND gate are well known. The rotary switch, stepping motor, and oscillator and stepping motor controller are components of a representative commutator which illustrates the process of generating a time division multiplexed signal for controlling a plurality of simultaneously operating printing elements. Known electronic commutators comprising transistor switches energized by sequential switch drivers are preferred.

Receiver controller 32 demultiplexes the time division multiplexed signal to direct graphic information to corresponding charging electrodes and to transmit synchronizing information to control the endless band. A signal from detector 30 enters signal separator 60 which includes known integrating trigger circuits to sort the $A_i$, $B_j$, and C signal components according to pulse width into separate outputs labeled A, B, and C. A shift register and clock 61 receive and transfer the $A_i$ signal components into the shift register. When a $B_j$ signal component is received, states of the shift register corresponding to the $A_i$ signal components and transferred in parallel to amplifiers 62 which control charging electrodes such as 13. The shift register is then clear to enter another sequence of the $A_i$ signal components.

The endless band is advanced at a constant speed during operation of either the transmitter or receiver portions and is further synchronized with position information during operation of the receiver portion. One endless band function is that of an armature of a linear induction motor wherein speed is controlled by adjustment of synchronous frequency. Band controller 33 adjusts endless band driving frequency in response to pulse arrival times on inputs 66 and 67. Normally, pulse inputs on 66 and 67 coincide to indicate synchronism and the endless band is controlled in response to B pulses on 65 which are divided to a lower frequency symmetrical waveform by such means as flip-flop circuits, are amplified, and are connected to the stator of a linear induction motor 12 which drives the endless band. If the pulses on 66 and 67 do not coincide, lead or lag of the pulse on 67 is determined and the endless band driving frequency is decreased or increased respectively until the pulses on 66 and 67 coincide. A process and apparatus for selecting the driving frequency comprises the following. A C pulse on 66 triggers a monostable multivibrator to generate a reference sequare wave having a transition to a positive level at the time an aperture of the remote transmitter crosses the gap between photodetectors and having a timed return to a zero level to approximate an aperture crossing the center of a photodetector. If the pulse from the receiver aperture detector on 67 coincides with the positive portion of the monostable multivibrator's direct output, the endless band is leading and such coincidence on a leading AND gate triggers a pulse output. If the pulse on 67 coincides with the zero level portion of the monostable multivibrator's direct output, the endless band is lagging and coincidence with a positive output complementary to the zero level portion on a lagging AND gate triggers a pulse output. Coincidence of the pulses on 66 and 67 on a synchronous AND gate triggers a pulse output. The pulse outputs of the leading, lagging, and synchronous AND gates are mutually exclusive and each connects to a hold circuit which connects to an oscillator at one of the drive frequencies. The selected oscillator is held to drive the endless band until arrival times af the pulses on 66 and 67 change order to cause selection of another oscillator.

Figure 4:
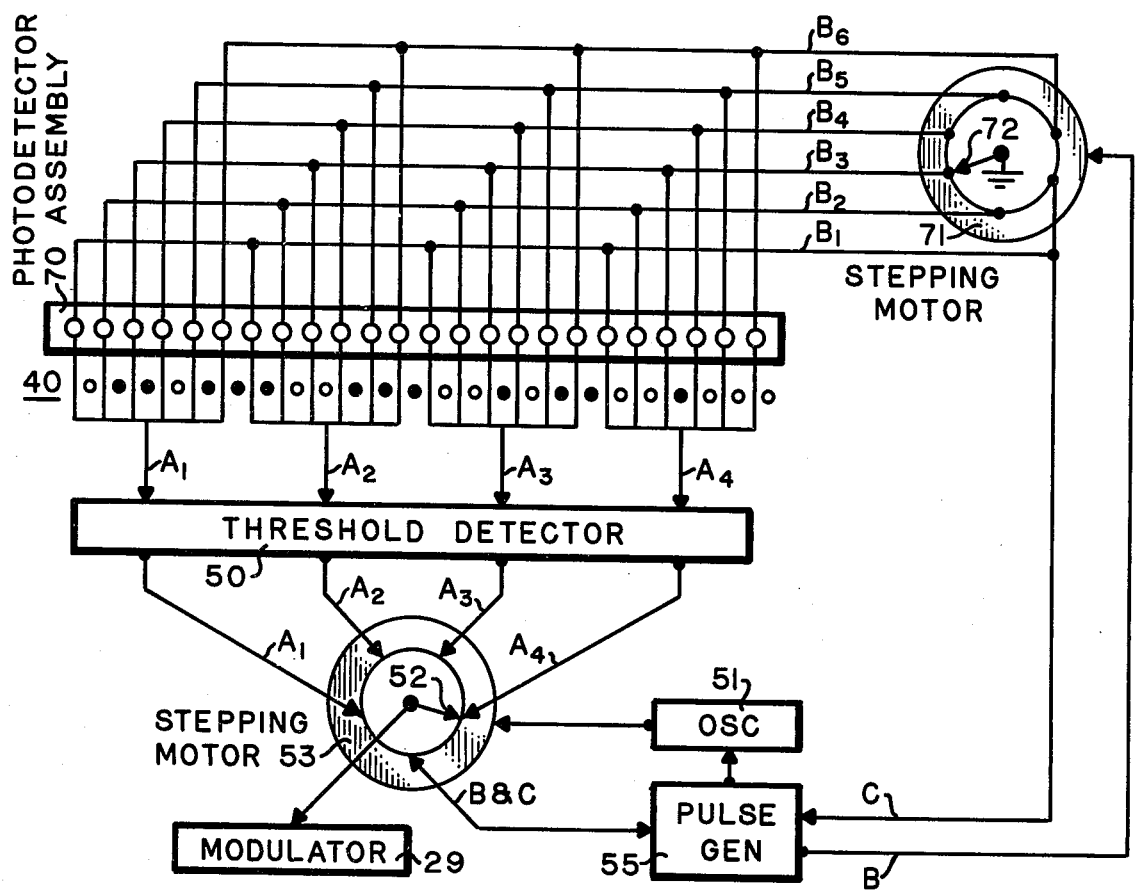
FIG. 4 is a highly diagrammatic representation of an alternative means for generating the signal using a linear array of stationary photodetectors.

FIG. 4 shows an alternative method for generating the signal described with reference to FIG. 2. Photodetectors having the approximate dimensions of an elemental area are energized sequentially at uniform intervals to sample a line of elemental areas in the pattern provided by apertures in an advancing endless band. An ink drop printer having a corresponding linear array and sequential energizing of printing elements is disclosed by the present applicant in U.S. Pat. No. 3,943,525. Accordingly, the time division multiplexed signal of FIG. 2 can be generated by alternative scanning means and it can be used to control alternative printers all of which are characterized by a plurality of simultaneously operating and uniformly spaced elements advancing along a line.

A photodetector assembly 70 comprising a linear array of photodetectors is positioned to receive an image of a graphic pattern represented by a line of dots at 40. The photodetectors are connected on one side in segments $A_i$ which connect to a threshold detector 50. The threshold detector connects to a parallel to serial converter represented by a rotary switch 52 which is advanced by stepping motor 53 as described with reference to FIG. 3. The photodetectors are connected on the other side at uniform intervals to lines labeled $B_j$ which connect to contacts of another serial to parallel converter represented by stepping motor 71 and rotary switch 72. When rotary switche 52 advances to contact labeled B&C, pulse generator and controller 55 transmits electrical power to stepping motor 71 which advances rotory switch 72 to the next contact. When rotary switch 72 advances to contact labeled $B_1$, a signal on line C to pulse generator 55 causes stepping motor 53 to dwell for an extended interval to generate a third signal component. Alternatively, the $B_1$ and C pulses may be generated separately as also shown in FIG. 2 by including an additional contact and a modified stepping control program, The steps described generate the time division multiplexed signal described with reference to FIG. 2 which is connected to modulator 29 for transmission into a broadband network.

What I claim is:

1. A method for controlling a graphic receiver by a remote graphic transmitter through a time division muliplexed signal, said grahic receiver having a plurality of uniformly spaced printing elements in a linear array advancing at the same speed along a line parallel to the printing elements and said graphic transmitter having a corresponding plurality of uniformly spaced scanning elements in a linear array advancing at the same speed along a line parallel to the scanning elements comprising the steps of detecting at each of the scanning elements a level of light reflected from a document to generate a corresponding signal amplitude, sampling sequentially in a predetermined order the signal amplitude from each of the scanning elements to generate a sequence of first signal components, advancing the scanning elements to adjacent elemental areas of the document, generating a second signal component at a time separate from the first signal components to represent a complete sampling of the signal amplitudes, repeating the previous steps and generating a third signal component at a time separate from the first signal component when a scanning element advances to a reference position, transmitting to a remote receiver through a single channel a representation of the first, second, and third signal components in a time sequence of their generation, separating the first, second, and third signal components in the receiver, accumulating the first signal components in a predetermined order following a second signal component to provide serial to parallel conversion of the first signal components, transferring said accumulated first signal components in response to the second signal component to control the printing elements in the predetermined order of scanning so that an image is formed on a receiving surface in the same order as the detected light levels on the document surface, advancing the printing elements to adjacent elemental areas of the receiving surface to form an image in response to the first and second signal components, detecting a printing element at a reference location and measuring a time difference between said detection at the reference location and the third signal component, and changing the rate of advance of the printing elements to eliminate said time difference thereby synchronizing the position of the printing elements with the scanning elements.

2. A facsimile system wherein a time division multiplexed signal is generated to control a remote receiver comprising a plurality of uniformly spaced scanning elements in a linear array advancing along a line parallel to the scanning elements, means for generating signal amplitudes corresponding to light received by each of the scanning elements, means for sampling cyclically said signal amplitudes sequentially to generate a first signal component, means to generate a second signal component in each said sampling cycle to occur at a time separate from the first signal components, means to detect advance of the scanning elements across a reference position to generate a third signal component to occur at a time separate from the first signal components, means to transmit the three signal components to a remote receiver having a plurality of uniformly spaced printing elements in a linear array, means to accumulate the first signal components and to release said first signal components when a second signal component is received to control printing of the printing elements, and means to advance the printing elements along a line parallel to the printing elements, means to detect advance of the printing elements across a reference position for comparison to the third signal component, and means to adjust a rate of advance of the printing elements for coincidence of said detection across a reference position with the third signal component.

3. A method for generating a signal in a facsimile system having scanning elements and printing elements in a linear array and grouped into segments along a line for simultaneous operation of each said group comprising the steps of scanning a document line by means of a plurality of scanning elements grouped to correspond to a plurality of contiguous segments of the document line, developing an amplitude from each said group of scanning elements, each said amplitude corresponding to light reflected from an elemental area of one of the segments, sampling sequentially in a predetermined order each said amplitude thereby generating a time division multiplexed sequence of amplitudes from amplitudes present simultaneously, transforming the sequence of amplitudes into a signal having a similar sequence of corresponding amplitudes for transmission through a channel to a graphic receiver to control the printing elements for a facsimile reproduction of the scanned elemental areas.

4. The method of claim 3 with the added step of generating a second signal component for each cyclical sequence of said sampled amplitudes, said second signal component corresponding to an advance of the scanning elements to another elemental area in each said segment.

5. The method of claim 4 with the added step of generating a third signal component when all elemental areas in the document line have been scanned, said third signal component providing reset information to synchronize position of the printing elements.

6. Apparatus for generating a time division multiplexed signal in a facsimile system to control a plurality of simultaneously operating printing elements in a linear array comprising a linear array of scanning elements grouped to correspond to a plurality of contiguous segments of a document line, means to project an image of elemental areas of the document line upon the scanning elements, means to select one of the elemental area images of each segment of the document line to develop a corresponding amplitude at each of the groups of scanning elements, means to sample sequentially in a predetermined order the amplitude at each of the groups of scanning elements, and means to transform the sequence of amplitudes into a corresponding cyclical first signal component representing in each cycle an elemental area from each of the segments for transmission through a channel for transformation in a graphic receiver to control the simultaneously operating printing elements.

7. The apparatus of claim 6 wherein said means to sample the amplitudes further includes means to generate a second type of amplitude for transformation to a second signal component for each cycle of the first signal components to provide synchronizing information for the graphic receiver.

8. The apparatus of claim 7 wherein said means to generate the first and the second types of amplitude further includes means to generate a third type of amplitude for transformation into a third signal component after all of the elemental areas in the document line have been scanned to provide reset information for the graphic receiver.

9. The apparatus of claim 8 wherein the means to generate the first, second, and third types of amplitudes comprises a ring counter to sequence switching of the first type of amplitude at each of the groups of scanning elements, to switch to a source of the second type of amplitude when a cycle the first type of amplitude is complete, and to switch to a source of the third type of amplitude when a means for detecting scanning of all elemental areas of a document line is enabled.

10. The apparatus of claim 6 wherein said linear array of scanning elements comprises one photodetector corresponding to each elemental area of the document line image, said photodetectors functioning in groups corresponding to the segments of the document line, said means to select one of the elemental area images to develop an amplitude from each of the groups comprises a first switching means having a plurality of terminals with each terminal connecting to one side of the photodetectors in one of the groups, a second switching means having a plurality of terminals with each of the terminals connecting to another side of the photodetectors which are in a similar location in each of the groups, said means to sample sequentially the amplitudes from each of the groups comprises means to sequentially contact the terminals in the first switching means, and means to repeat the cycle of generating first signal components comprises means to sequentially contact the terminals of the second switching means when all of the terminals of the first switching means have been contacted.

11. The apparatus of claim 6 wherein said linear array of scanning elements comprises a plurality of uniformly spaced apertures in an endless band and a plurality of elongated photodetectors, each photodetector being substantially the length of the image of the segments of the document line, each said apparatus moving along the photodetectors to project an image of an elemental area similarly located on the segments thereby selecting an elemental area image from each segment to develop an amplitude at each photodetector for cyclical sampling.

12. A facsimile printer having a plurality of printing elements operating simultaneously in response to a time division multiplexed signal comprising a linear array of printing elements operating in groups corresponding to contiguous line segments of a printed line, each said group having one selected printed element enabled for printing at similar positions along each said printed line segment, means to detect the time division multiplexed signal which signal comprises a sequence of amplitudes representing elemental areas of a document line which line consists of contiguous line segments which segments correspond to said printed line segments, said elemental areas selected from similarly located positions along each said document line segment, and means to direct the directed amplitudes to printing control means of each said group of printing elements to enable said selected printing elements to operate simultaneously.

13. The facsimile printer of claim 12 wherein the time division multiplexed signal includes a second type of amplitude to provide synchronizing information and the facsimile printer further includes means to separate the second type of amplitude from other signal components, and means responsive to the second type of amplitude to enable printing elements operating adjacent to just printed elemental areas thereby advancing printing in each said printed line segment simultaneously.

* * * * *